US010103587B2

(12) United States Patent
Kudou

(10) Patent No.: US 10,103,587 B2
(45) Date of Patent: Oct. 16, 2018

(54) ROTARY ELECTRIC MACHINE FOR VEHICLES

(71) Applicant: DENSO CORPORATION, Kariya, Aichi-pref. (JP)

(72) Inventor: Takuya Kudou, Kariya (JP)

(73) Assignee: DENSO CORPORATION, Kariya (JP)

( * ) Notice: Subject to any disclaimer, the term of this patent is extended or adjusted under 35 U.S.C. 154(b) by 162 days.

(21) Appl. No.: 15/154,182

(22) Filed: May 13, 2016

(65) Prior Publication Data

US 2016/0336821 A1 Nov. 17, 2016

(30) Foreign Application Priority Data

May 15, 2015 (JP) ................................ 2015-099769
Sep. 10, 2015 (JP) ................................ 2015-178578

(51) Int. Cl.
*H02K 1/24* (2006.01)

(52) U.S. Cl.
CPC ......... *H02K 1/243* (2013.01); *H02K 2213/03* (2013.01)

(58) Field of Classification Search
CPC ...................................................... H02K 1/243
USPC ..... 310/263, 156.66–156.69, 156.71–156.73
See application file for complete search history.

(56) References Cited

U.S. PATENT DOCUMENTS 6,291,921 B1 * 9/2001 Asao ..................... H02K 1/243 310/254.1
6,433,455 B1 * 8/2002 Kometani ............. H02K 1/243 310/263
6,703,758 B2 * 3/2004 Buening ............... H02K 1/243 310/263
2002/0021052 A1 2/2002 Asao

FOREIGN PATENT DOCUMENTS

JP 2010-051052 A 3/2010

* cited by examiner

*Primary Examiner* — Terrance Kenerly
(74) *Attorney, Agent, or Firm* — Oliff PLC

(57) ABSTRACT

Each of claw-shaped magnetic poles is formed with an air gap expanding portion formed on at least a portion of both side portions in a circumferential direction, and an air gap is formed between the air gap expanding portion and tip portions of teeth that is larger than another air gap formed between radial end portions and the tip portions of the teeth. When a circumferential distance between the radial end portion and the tip portion is indicated by τ, and when the air gap is indicated by δ, 3δ≤τ≤15δ is satisfied. When a claw-tip end face width is indicated by L1, and when a claw-root end face width is indicated by L2, the claw-shaped magnetic pole is formed in a range of 0.20≤L1/L2≤0.71.

8 Claims, 12 Drawing Sheets

ROTARY ELECTRIC MACHINE FOR VEHICLES

CROSS-REFERENCE TO RELATED APPLICATION

This application is based on and claims the benefit of priority from earlier Japanese Patent Applications No. 2015-99769 filed May 15, 2015, and No. 2015-178578 filed Sep. 10, 2015, the descriptions of which are incorporated herein by reference.

TECHNICAL FIELD

The present disclosure relates to a rotary electric machine for vehicles including a stator and a rotor.

BACKGROUND

Conventionally, an example of a technique regarding an automotive AC generator of which an object is to reduce magnetic noises by reducing an incorrect magnetic flux amount flowing between claw-shaped magnetic poles adjacent to each other via teeth is disclosed and (refer to Japanese Patent Application Laid-Open Publication No. 2002-058220, for example).

The above automotive AC generator has air gap extended surfaces formed on outer diameter sides of the claw-shaped magnetic poles, and a circumferential center of the magnetic poles and a circumferential center of tip portions of the teeth are at the same radial positions.

Further, the tip portions of the teeth do not overlap with radially-outermost surfaces of the claw-shaped magnetic poles, and are configured to overlap with portions of the air gap extended surfaces.

When an air gap is indicated by $\delta$, and a circumferential distance between the radially-outermost surface and the tip portion of the teeth is indicated by $\tau$, it is configured that $0<\tau<3\delta$.

However, even when the circumferential distance between the radially-outermost surface and the tip portion of the teeth is configured to be $0<\tau<3\delta$, there is a problem that magnetic flux leakage flowing between each of the claw-shaped magnetic poles through the tip portion of the teeth exists.

Further, by areas of the radially-outermost surfaces of to the claw-shaped magnetic poles being reduced, magnetic resistance of a magnetic circuit increases, and there is a problem that the magnetic flux generated will decrease.

Furthermore, since the claw-shaped magnetic poles are not properly chamfered and portions where a variation of the magnetic flux is sharp exist, there is a problem that the magnetic noise increases.

SUMMARY

An embodiment provides a rotary electric machine for vehicles that can reduce a magnetic flux leakage more than before.

The embodiment further provides the rotary electric machine for vehicles that can increase a magnetic flux generated of claw-shaped magnetic poles more than before.

The embodiment further provides the rotary electric machine for vehicles that can reduce magnetic noise more than before.

A rotary electric machine for vehicles according to a first aspect includes a stator having a stator core in which slots are located between a plurality of teeth extending radially at intervals in a circumferential direction and stator windings incorporated with the slots.

The rotary electric machine for vehicles further includes a pair of pole cores formed with tapered claw-shaped magnetic poles disposed at a predetermined pitch in the circumferential direction, the pole cores are fixed to a shaft such that the claw-shaped magnetic poles face and engage with each other, and the pole cores are disposed so that an air gap is formed between radial end portions of the claw-shaped magnetic poles and tip portions of the teeth.

The rotary electric machine for vehicles further includes a rotor having a field coil disposed so as to be covered by the claw-shaped magnetic poles.

Each of the claw-shaped magnetic poles is formed with an air gap expanding portion formed on at least portions of both side portions in the circumferential direction, and another air gap is formed between the air gap expanding portion and the tip portions of the teeth that is larger than the air gap formed between the radial end portions and the tip portions of the teeth.

Each of the claw-shaped magnetic poles is formed that when an inter-pole center position which is a center of the claw-shaped magnetic poles adjacent to each other in the circumferential direction and a teeth center position which is a center of the teeth are at the same radial positions, tip portions of the claw-shaped magnetic poles do not overlap in the radial direction with each of the radial end portions of the claw-shaped magnetic poles adjacent to each other, and the tip portions of the claw-shaped magnetic poles overlap in the radial direction with at least a portion of each of the air gap enlargement portions of the claw-shaped magnetic poles adjacent to each other in the circumferential direction.

When a circumferential distance between the radial end portion and the tip portion of the teeth is indicated by $\tau$, and when the air gap is indicated by $\delta$, each of the claw-shaped magnetic poles is formed in the range of $3\delta\leq\tau\leq15\delta$.

When a claw-tip end face width is indicated by L1, and when a claw-root end face width is indicated by L2, each of the claw-shaped magnetic poles is formed in a range of $0.20\leq L1/L2\leq0.71$.

According to the above configuration, since the circumferential distance between the radial end portion of the claw-shaped magnetic pole and the tip portion of the teeth is ensured to be within the range of $3\delta\tau\leq15\delta$, the magnetic leakage flux can be reduced than before.

Since areas of the end faces of the claw-shaped magnetic poles are increased by forming the claw-shaped magnetic poles within the range of $0.20\leq L1/L2\leq0.71$, a generated magnetic flux amount can be increased more than before.

Further, it is possible to improve the output by additive effects of reducing the leakage flux and increasing the generated magnetic flux amount.

Note that a rotary electric machine can be any type as long as a device has a portion that rotates (for example, a shaft or the like).

For example, a generator, an electric motor, a motor-generator or the like is applicable.

A rotor is formed into a circular shape (including an annular, cylindrical, or the like).

A stator winding can be any type as long as there are three or more phase windings.

A claw-shaped magnetic pole may be configured by a soft magnetic material, may be formed of a magnet, or may be configured by combining a soft magnetic material and a magnet.

DETAILED DESCRIPTION OF THE PREFERRED EMBODIMENTS

Hereinafter, embodiments for implementing the present disclosure will be described with reference to the drawings.

Note that to connect means to connect electrically unless otherwise specified.

Each drawing shows elements necessary for describing the present disclosure, and it is not necessarily showing all actual elements.

When mentioning directions of up, down, left and right, etc., they are based on a description of the drawings.

Reference signs using upper and lower case characters refer to different elements.

To fix refers to any fixing method as long as objects can be fixed together.

The term annular includes cylindrical.

In the following, for the sake of simplicity, a rotary electric machine for vehicles is simply referred to as a rotary electric machine.

An axial direction may be an axial direction in itself, or may be a direction intersecting the axial direction (oblique direction).

An outer diameter side refers to an outside or an outer peripheral side in a radial direction, and an inner diameter side refers to an inside or an inner circumferential side in the radial direction.

First Embodiment

A first Embodiment will be described with reference to FIGS. 1 to 6.

Figure 1:
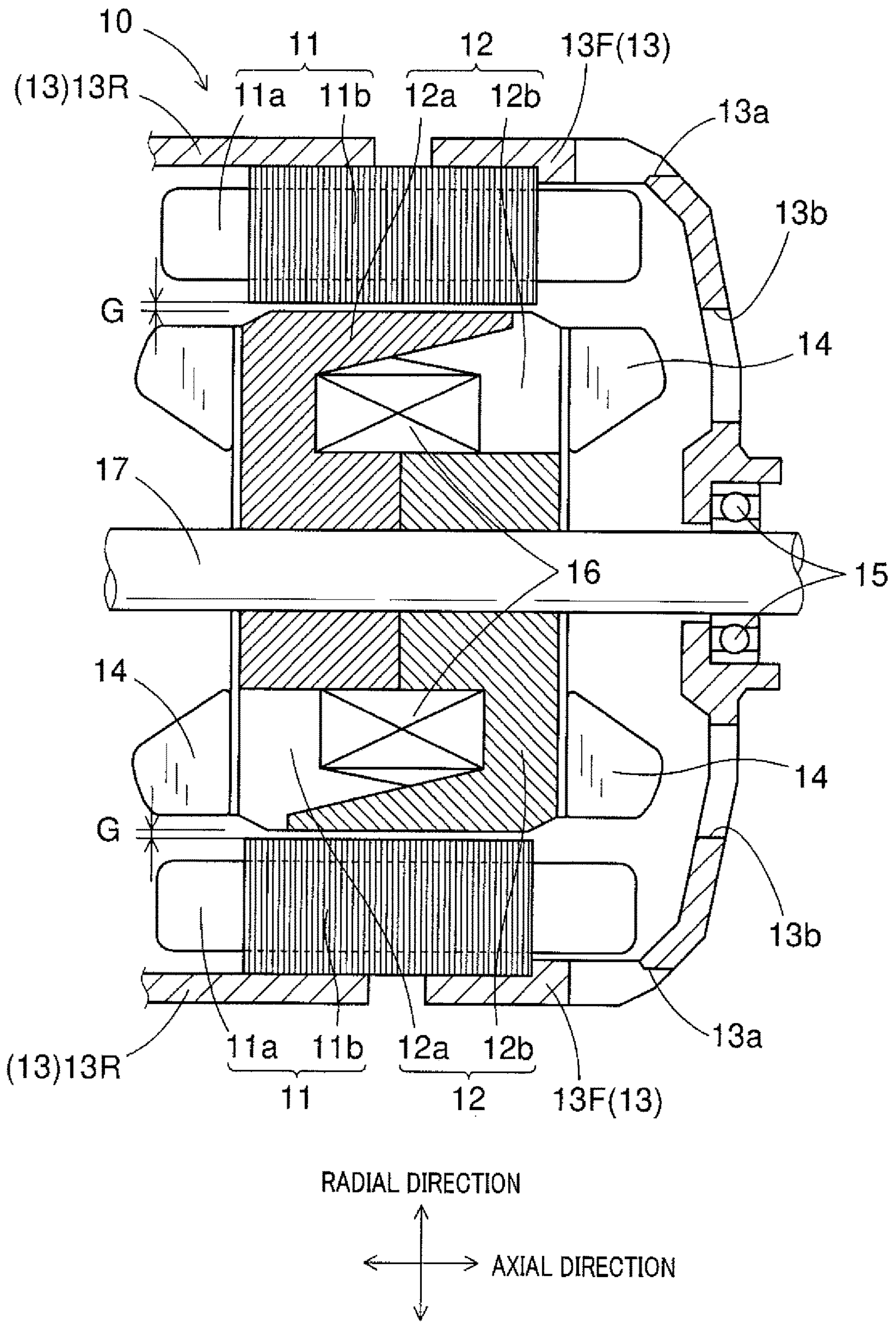
FIG. 1 shows a schematic partially sectional view of a rotary electric machine in a first configuration example.

A rotary electric machine 10 shown in FIG. 1 is an inner-rotor type generator, and has a stator 11, a rotor 12, cooling fans 14, a shaft 17, and etc. within a housing 13.

It should be noted that an upper half of FIG. 1 shows a sectional view of a pole core 12*a* being cut, and a lower half of FIG. 1 shows a sectional view of another pole core 12*b* being cut.

The housing 13 may be formed in any shape as long as it can accommodate the elements described above.

The housing 13 of a configuration example shown in FIG. 1 has a front housing 13F and a rear housing 13R or the like.

Cooling air discharge holes 13*a* and cooling aft intake holes 13*b* are disposed in the housing 13.

It should be noted that the housing 13 is also referred to as a frame or a case.

Although not shown, slip rings, a rectifier, pulleys or the like may be accommodated in the housing 13.

The stator 11 has stator windings 11*a*, a stator core 11*b*, or the like.

Figure 2:
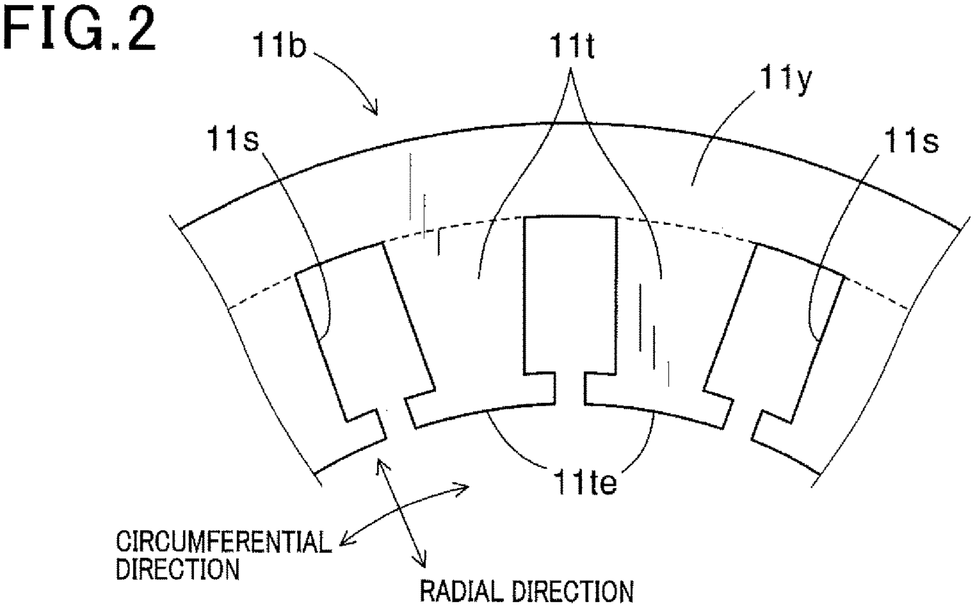
FIG. 2 shows a schematic plan view of a stator as viewed from an axial direction in the first configuration example.

The stator windings 11*a* are windings with three-phase or more, and incorporated with the stator core 11*b* by being accommodated in slots 11*s* (refer to FIG. 2).

A specific configuration example of the stator core 11*b* will be described later (refer to FIG. 2).

The rotor 12 is disposed with an air gap G between the stator 11 (specifically between teeth 11*t* of the stator core 11*b*).

The size of the air gap G may be set arbitrarily.

A specific configuration example of the rotor 12 will be described later (refer to FIG. 3).

A plurality of cooling fans 14 is an example of a cooling means.

Each cooling fan 14 is disposed close to the stator windings 11*a*, and is fixed to an axial end surface of the rotor 12.

With the rotation of the rotor 12, the cooling fans 14 suck cooling air from the cooling air intake holes 13 *b*, and discharge the cooling air from the cooling air discharge holes 13*a*.

By the cooling air flow, it is possible to cool the whole rotary electric machine 10 including the stator 11 (in particular the stator windings 11*a*).

Since bearings 15 are interposed between the housing 13 and the shaft 17, the shaft 17 is supported rotatably.

Further, the shaft 17 is also a rotating member fixed directly or indirectly to the rotor 12, and rotates together with the rotor 12.

The stator core 11*b* shown in FIG. 2 is a semi-closed slot type, and has a plurality of teeth 11*t*, a yoke 11*y*, and the like.

The yoke 11*y* may be formed in any shape, and it is formed in an annular shape in the present embodiment.

The plurality of teeth 11*t* is formed to extend inwardly in the radial direction from the yoke 11*y* at intervals in a circumferential direction.

The teeth 11*t* and the yoke 11*y* may be formed integrally as shown, or they may be formed separately and fixed to each other.

A space formed between teeth 11*t* adjacent to each other in the circumferential direction forms the slot his for accommodating the stator windings 11*a*.

That is, the slots his are disposed in the stator core 11*b* formed by the plurality of teeth 11*t*.

Figure 3:
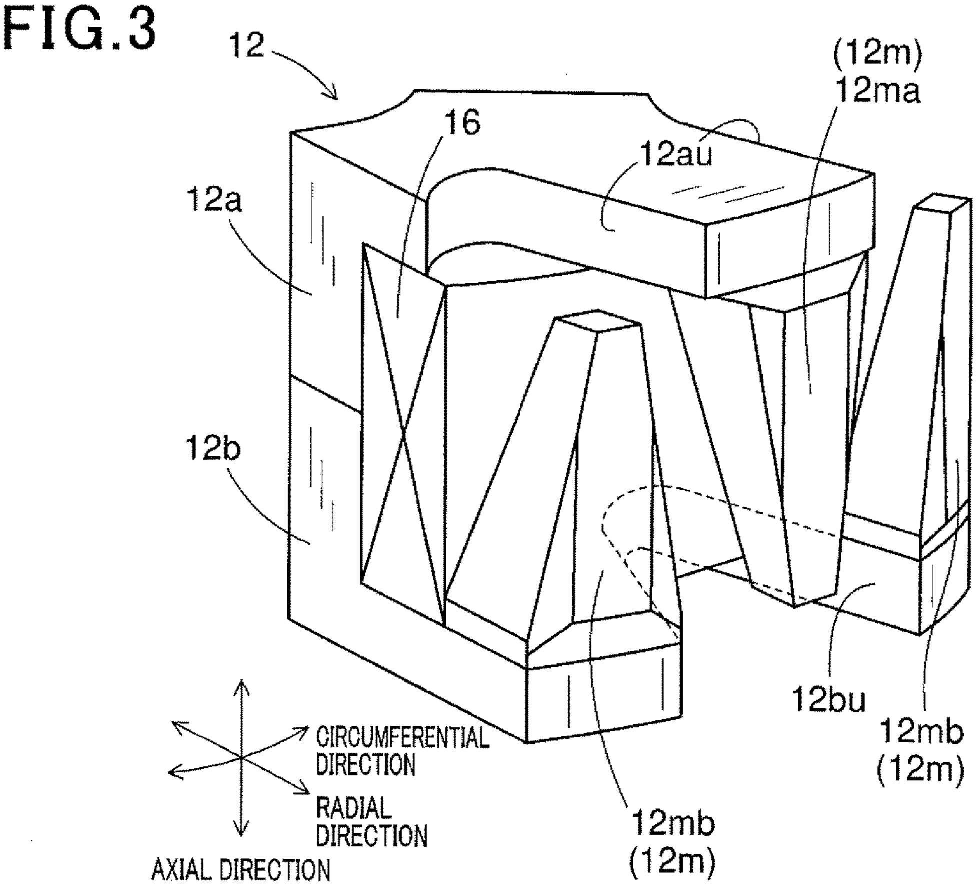
FIG. 3 shows a schematic perspective view of a part of a rotor in the first configuration example.

The rotor 12 shown in FIG. 3 has a pair of pole cores 12*a* and 12*b*, a field coil 16, and the like.

The pole core 12*a* has a plurality of claw-shaped magnetic poles 12*ma*, a plurality of U-shaped grooves 12*au*, and the like.

The plurality of claw-shaped magnetic poles 12*ma* are disposed on the outer diameter side end portion of the pole core 12*a* in the circumferential direction, and are formed in tapered shapes at a predetermined pitch from the outer diameter side end portion.

The pole core 12*b* has a plurality of claw-shaped magnetic poles 12*mb*, a plurality of U-shaped grooves 12*bu*, and the like.

The plurality of claw-shaped magnetic poles 12*mb* are disposed on the outer diameter side end portion of the pole core 12*b* in the circumferential direction, and are formed in tapered shapes at a predetermined pitch from the outer diameter side end portion.

The predetermined pitch is appropriately set according to the number of claw-shaped magnetic poles.

Each of the claw-shaped magnetic poles 12*ma*, 12*mb* corresponds to a claw-shaped magnetic pole 12*m*.

The plurality of the claw-shaped magnetic poles 12*ma* and the plurality of claw-shaped magnetic poles 12*mb* are disposed alternately facing each other so as to engage with each other.

The pole cores 12*a*, 12*b* and the claw-shaped magnetic poles 12*ma*, 12*mb* are formed by a soft magnetic material.

The U-shaped grooves 12*au*, 12*bu* are cut toward center sides of the pole cores 12*a*, 12*b* to an extent that magnetic flux leakage does not occur from the claw-shaped magnetic poles 12*ma*, 12*mb*.

The field coil 16 is disposed so as to be covered by the pole cores 12*a*, 12*b* and the claw-shaped magnetic poles 12*ma*, 12*mb*.

When the field coil 16 is energized, the claw-shaped magnetic poles 12 *ma*, 12*mb* are magnetized with N pole or S pole.

A configuration example of the claw-shaped magnetic pole 12*ma* and claw-shaped magnetic pole 12*mb* which are circumferentially adjacent will be explained with reference to FIG. 4.

The claw-shaped magnetic pole 12*ma* is included in the plurality of claw-shaped magnetic poles 12*ma* formed extending from the pole core 12*a*.

The claw-shaped magnetic pole 12*mb* is included in the plurality of claw-shaped magnetic poles 12*mb* formed extending from the pole core 12*b*.

The number of the claw-shaped magnetic poles 12*ma*, 12*mb* may be set arbitrarily.

Forms of the claw-shaped magnetic poled 12*ma*, 12*mb* are the same in second and subsequent embodiments.

Figure 4:
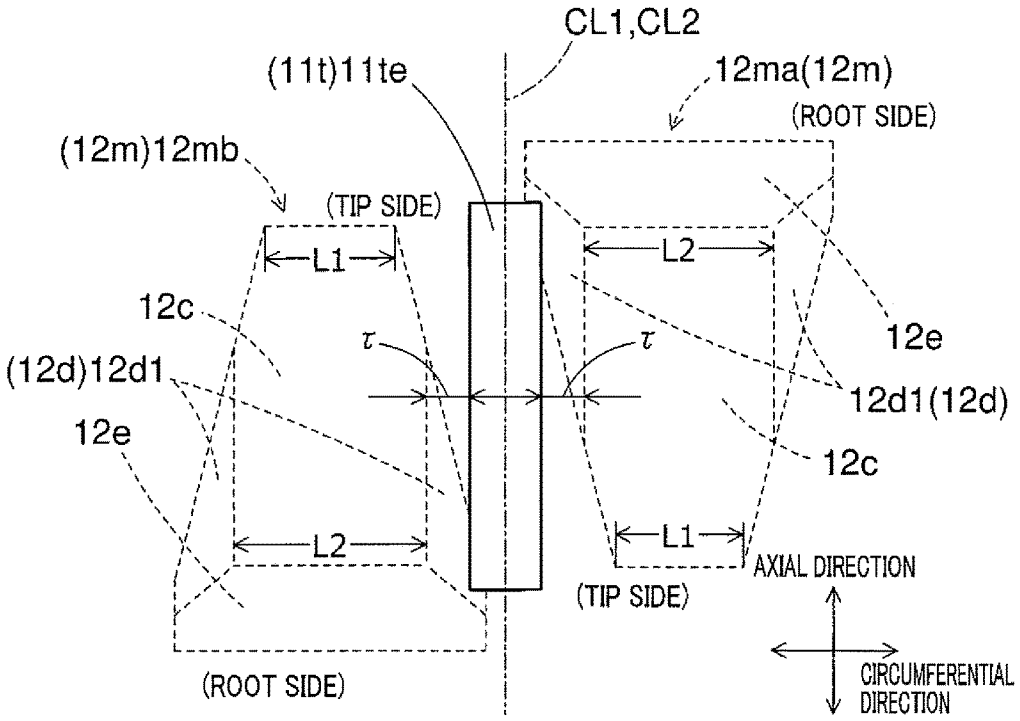
FIG. 4 shows a schematic diagram of teeth and claw-like magnetic poles in the first configuration example.

An inter-pole center position CL1 shown by a dashed line in FIG. 4 is a center between the claw-shaped magnetic pole 12*ma* and the claw-shaped magnetic pole 12*mb*.

A teeth center position CL2 similarly shown by the dashed line is a center of the tooth 11*t*.

In other words, FIG. 4 shows a state where the inter-pole center position CL1 and the teeth center position CL2 match.

It should be noted that the claw-shaped magnetic pole 12*ma* and the claw-shaped magnetic pole 12*mb* are in the same shape except orientations in the axial direction are reversed.

Therefore, the claw-shaped magnetic pole 12*ma* is used as a representative feature in the following description unless otherwise specified.

The claw-shaped magnetic pole 12*ma* has a radial end portion 12*c*, first portions 12*d*1, a root portion 12*e*, and the like.

The radial end portion 12*c* is a portion that faces tip portions 11*te* of the teeth 11*t*, and is formed in a planar shape (flat surface or curved surface) toward a tip side in the axial direction shown.

The radial end portion 12*c* is a portion that protrudes most in the radial direction (the outer diameter side in the present embodiment) in the rotor 12.

The tip side in the axial direction of the radial end portion 12*c* is formed in a claw-tip end face width L1, and a root side in the axial direction is formed in a claw-root end face width L2.

Figure 6:
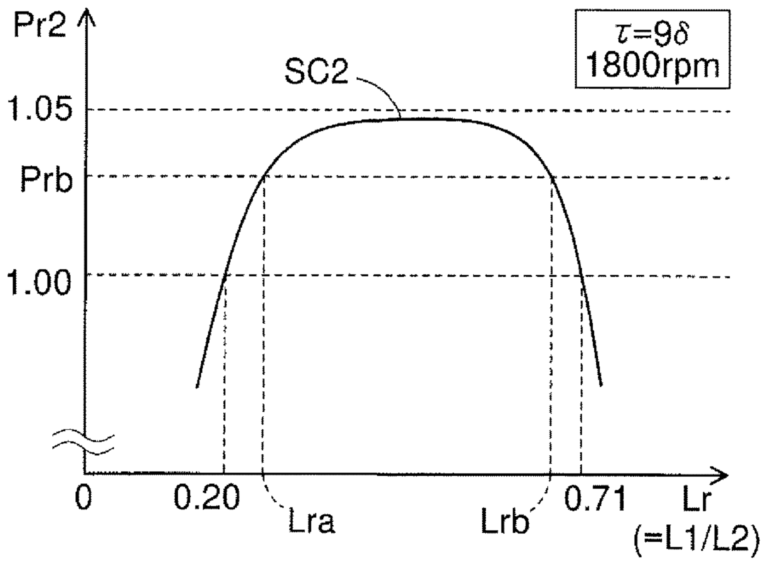
FIG. 6 shows a graph of an example of a relationship between a width ratio and the output ratio.

The claw-shaped magnetic pole 12*ma* may be formed in a range of $0.20 \leq L1/L2 \leq 0.71$ (refer to FIG. 6).

The root portion 12*e* is a portion rising from the pole core 12*a*.

The first portions 12*d*1 are portions of an air gap expanding portion 12*d*, and are formed on at least a portion of both side portions in the circumferential direction of the claw-shaped magnetic pole 12*ma*.

The first portions 12*d*1 are formed so as to have an air gap (i.e., a circumferential distance $\tau$) between the teeth 11*t* (the tip) larger than the air gap G.

Figure 5:
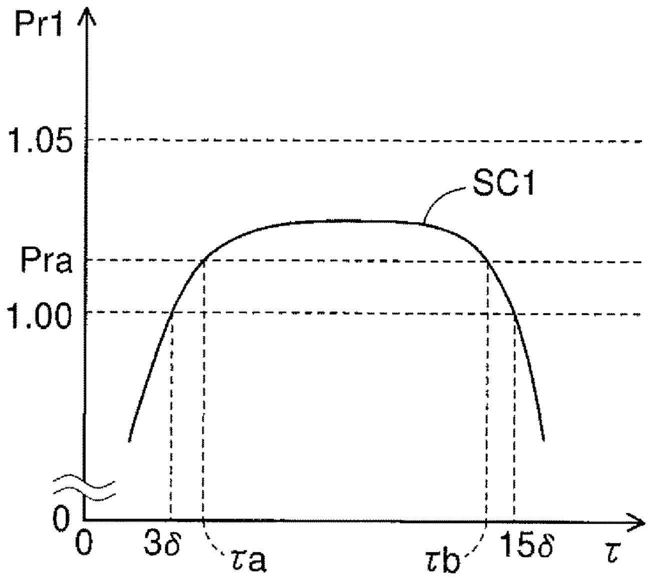
FIG. 5 shows a graph of an example of a relationship between a circumferential distance and an output ratio.

When the circumferential distance between the radial end portion 12*c* and the teeth 11*t* is indicated by $\tau$ (tau), and when the air gap G is indicated by $\delta$ (delta), the first portions 12*d*1 may be formed within a range of $3\delta \leq \tau \leq 15\delta$ (refer to FIG. 5).

A shape of the first portion 12*d*1 is not mattered to the extent that it is formed within the range.

That is, the shape may be a plane, a curved surface, or an uneven surface.

The claw-shaped magnetic pole 12*ma* and the other claw-shaped magnetic pole 12*mb* are configured such that a tip portion in the axial direction of one of the claw-shaped magnetic poles does not overlap with the radial end portion 12*c* of the other one of the claw-shaped magnetic poles.

In addition, the claw-shaped magnetic pole 12*ma* and the other claw-shaped magnetic pole 12*mb* are configured such that at least a part of the first portion 12*d*1 of one of the claw-shaped magnetic poles overlaps with the first part 12*d*1 of the other one of the claw-shaped magnetic poles.

A comparison of an output of the rotary electric machine 10 configured as above and an output of the automotive alternator disclosed in the Publication No. 2002-058220 (hereinafter simply referred to as a conventional technology) will be described with reference to FIGS. 5 and 6.

First, an output ratio Pr1 in a case of measuring an output by varying the circumferential distance r is shown in FIG. 5.

The output ratio Pr1 is an output of the rotary electric machine 10 in a case when the output of the conventional technology is set as 1.

The output of the present embodiment is an output of power generated (i. e., power output).

According to a characteristic line SC1 shown in FIG. 5, when the claw-shaped magnetic poles 12*ma*, 12*mb* are formed within the range that the circumferential distance $\tau$ is $3\delta \leq \tau \leq 15\delta$, the output is increased over the conventional technology.

The claw-shaped magnetic poles 12*ma*, 12*mb* may be formed so as to satisfy $\tau a \leq \tau \leq \tau b$ when the output ratio calculated based on a desired output is set to Pra.

The circumferential distances $\tau a$, $\tau b$ are numerical values satisfying $3\delta < \tau a < \tau b < 15\delta$.

In this way, the output more than an output having output ratio Pra can be reliably obtained.

Next, an output ratio Pr2 in a case of measuring the output by varying a width ratio Lr obtained by dividing the claw-tip end face width L1 by the claw-root end face width L2 (=L1/L2) in FIG. 6.

The output ratio Pr2 is, similarly to the output ratio Pr1, the output of the rotary electric machine 10 in the case when the output of the conventional technology is set as 1.

According to a characteristic line SC2 shown in FIG. 6, when the claw-shaped magnetic poles 12*ma*, 12MB are formed within the range that the width ratio Lr is $0.20 \leq Lr1 \leq 0.71$, the output is increased over the conventional technology.

The claw-shaped magnetic pole 12*ma*, 12*mb* may be formed so as to satisfy $Lra \leq Lr1 \leq Lrb$ when the output ratio calculated based on the desired output is set to Prb.

The width ratios Lra, Lrb are numerical values satisfying $0.20 < Lra < Lrb < 0.71$.

In this way, the output more than an output having output ratio Prb can be surely obtained.

Note that FIG. 6 shows results in a case where a circumferential distance $\tau$ is $\tau = 9\delta$, and a rotational speed of the rotor 12 is 1800 rpm.

Although not shown, if the circumferential distance $\tau$ is in the range of $3\delta \leq \tau \leq 156$, and the rotation speed of the rotor 12 is equal to or less than a rated speed, the same results as the characteristic line SC2 is obtained.

According to the rotary electric machine 10 described above, the claw-shaped magnetic poles 12*ma*, 12*mb* of the rotor 12 are formed in the range of the $3\delta \leq \tau \leq 15\delta$, and are also formed in the range of $0.20 \leq Lr1 \leq 0.71$ (refer to FIGS. 1 to 6).

According to the above configuration, since the circumferential distance $\tau$ is ensured greater than the conventional technology, it is possible to sufficiently reduce the magnetic flux leakage.

Further, it is possible to increase a generated magnetic flux amount by increasing areas of the end faces of the radial end portions 12*c*, thus it is possible to improve the output by additive effects.

Second Embodiment

A second embodiment will be described with reference to FIGS. 7 to 11.

It should be appreciated that, in the second embodiment, components identical with or similar to those in the first embodiment are given the same reference numerals, and repeated structures and features thereof will not be described in order to avoid redundant explanation unless otherwise specified.

Therefore, different points from the first embodiment will be mainly described.

First Configuration Example

Figure 7:
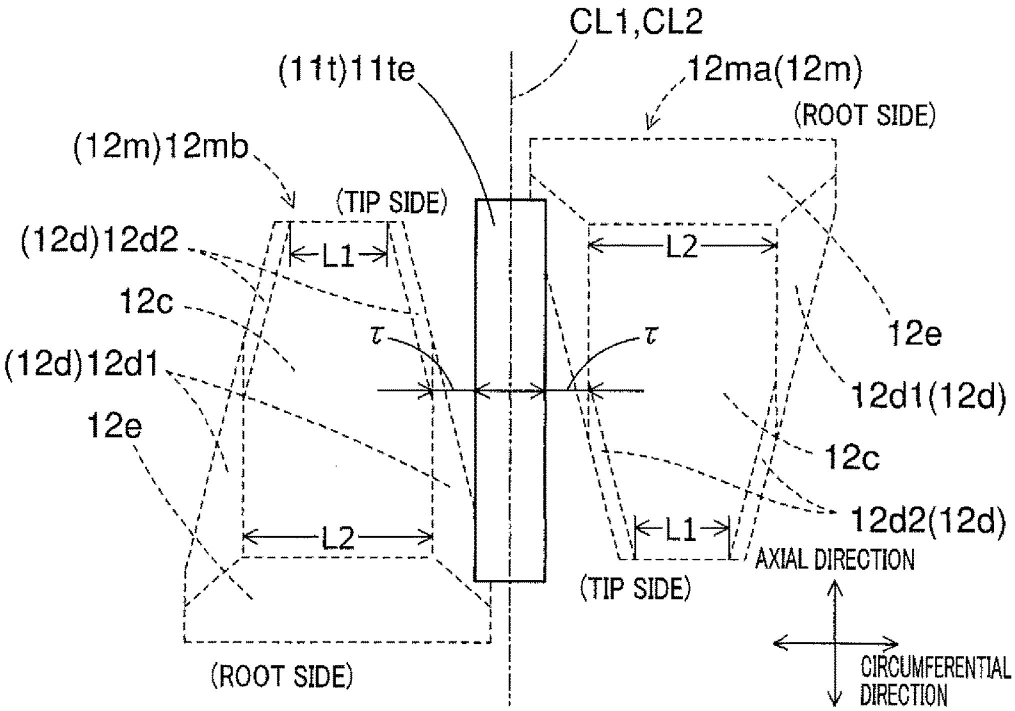
FIG. 7 shows a schematic diagram of teeth and claw-like magnetic poles in a second configuration example.
Figure 8:
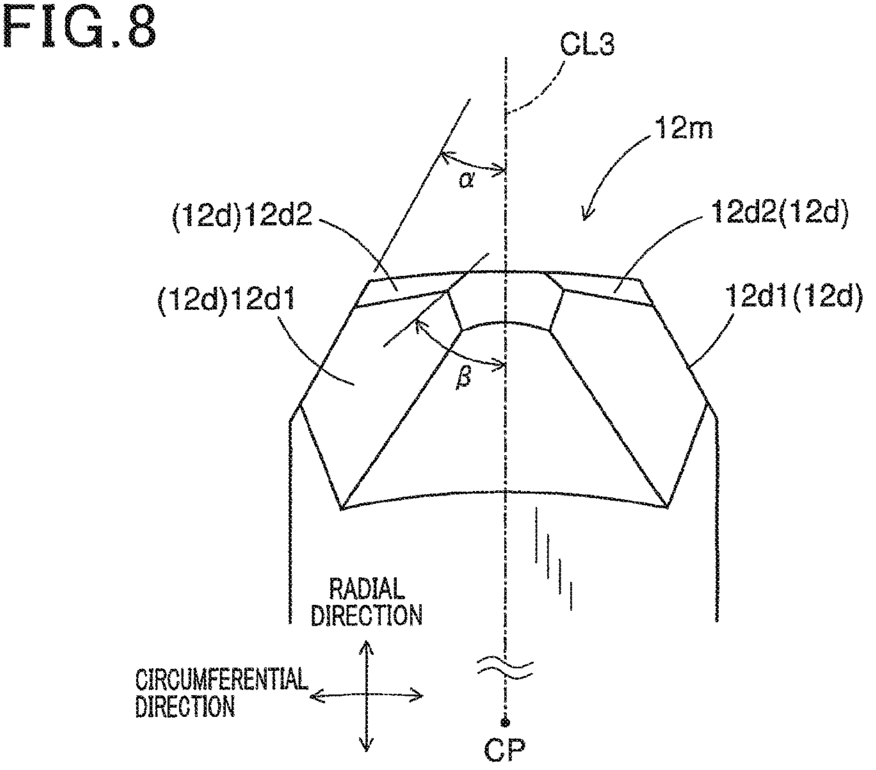
FIG. 8 shows a schematic diagram of a configuration example of a claw-shaped magnetic pole when viewed from the axial direction.

With reference to FIG. 7 and FIG. 8, a first configuration example of the claw-shaped magnetic poles 12*ma* and the claw-shaped magnetic poles 12*mb* circumferentially adjacent will be explained.

In the following, as in the case of the first embodiment (specifically, FIG. 4), the claw-shaped magnetic pole 12*ma* will be described as a representative feature.

The claw-shaped magnetic pole 12*ma* shown in FIG. 7 has a radial end portion 12*c*, first portions 12*d*1, second portions 12*d*2, a root portion 12*e*, and the like.

The difference from the claw-shaped magnetic pole 12*ma* shown in FIG. 4 is that the second portions 12*d*2 are further included in the present embodiment.

The second portions 12*d*2 are portions of an air gap expanding portion 12*d*, and are formed on at least a portion of both side portions in the circumferential direction of the claw-shaped magnetic pole 12*ma*.

The second portions 12*d*2 are formed extending from the tip of the claw-shaped magnetic pole 12*m* in the axial direction to first portions 12*d*1.

In FIG. 8, a central axis CL3 shown by a dashed line is a center line of the claw-shaped magnetic pole 12*m* extending from a rotation center CP of the rotor 12.

The first portion 12*d*1 described above is formed such that an angle formed between the central axis CL3 of the claw-like magnetic pole 12*m* (12*ma*, 12*mb*) to be a (alpha) when viewed from the axial direction.

Figure 11:
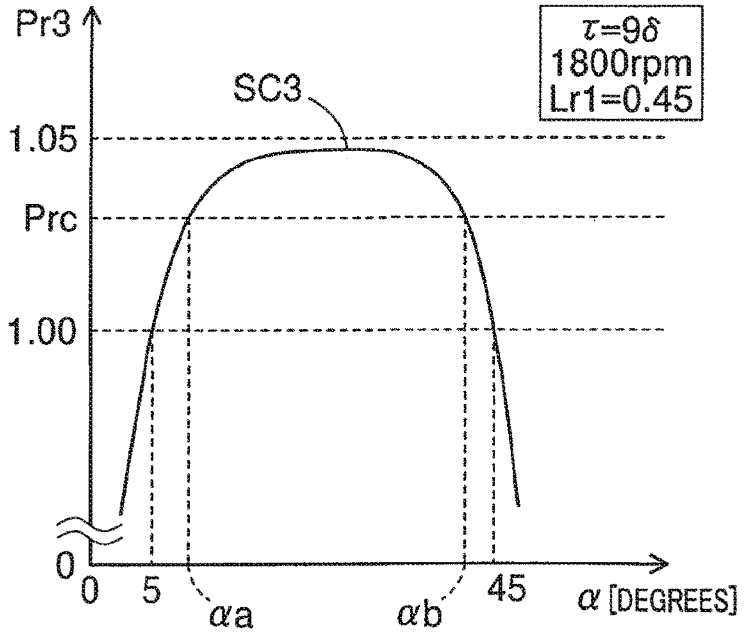
FIG. 11 shows a graph of an example of a relationship between an angle of an air gap expanding portion and the output ratio.

The first portion 12*d*1 may be formed in a range of $5° < \alpha < 45°$ (refer to FIG. 11).

On the other hand, the second portion 12*d*2 is formed such that an angle formed between the central axis CL3 of the claw-like magnetic pole 12*m* to be$\beta$ (beta) when viewed from the axial direction.

A relationship between the angles $\alpha$ and $\beta$ is $\alpha < \beta < 90°$.

In other words, with respect to the tip portion 11*te* of teeth 11*t*, the second portion 12*d*2 becomes a shallower angle than the first portion 12*d*1, and the magnetic flux becomes easy to flow.

Therefore, change in magnetic flux accompanying the rotation of the rotor 12 becomes smooth, thus it is possible to reduce magnetic noise.

Further, by appropriately setting the angle $\alpha$ of the first portion 12*d*1, it is possible to further reduce the magnetic flux leakage, and it is also possible to increase the generated magnetic flux amount by further increasing an area of the first portion 12*d*1, thus it is possible to reduce the magnetic noise.

Second Configuration Example

Figure 9:
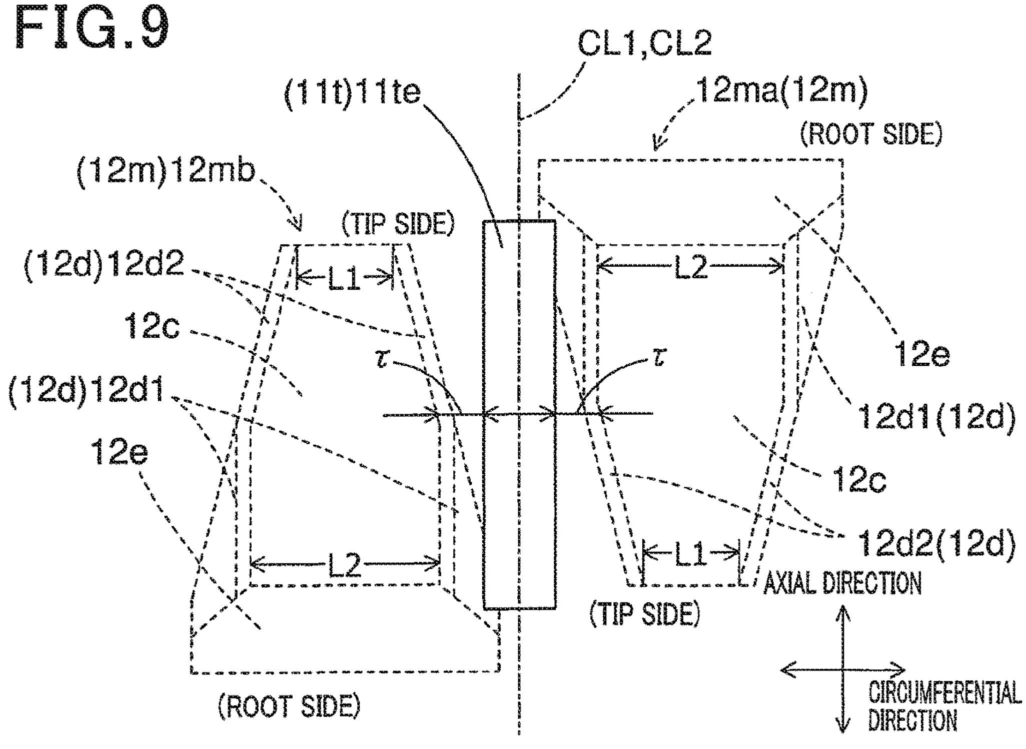
FIG. 9 shows a schematic diagram of teeth and claw-like magnetic poles in a third configuration example.
Figure 10:
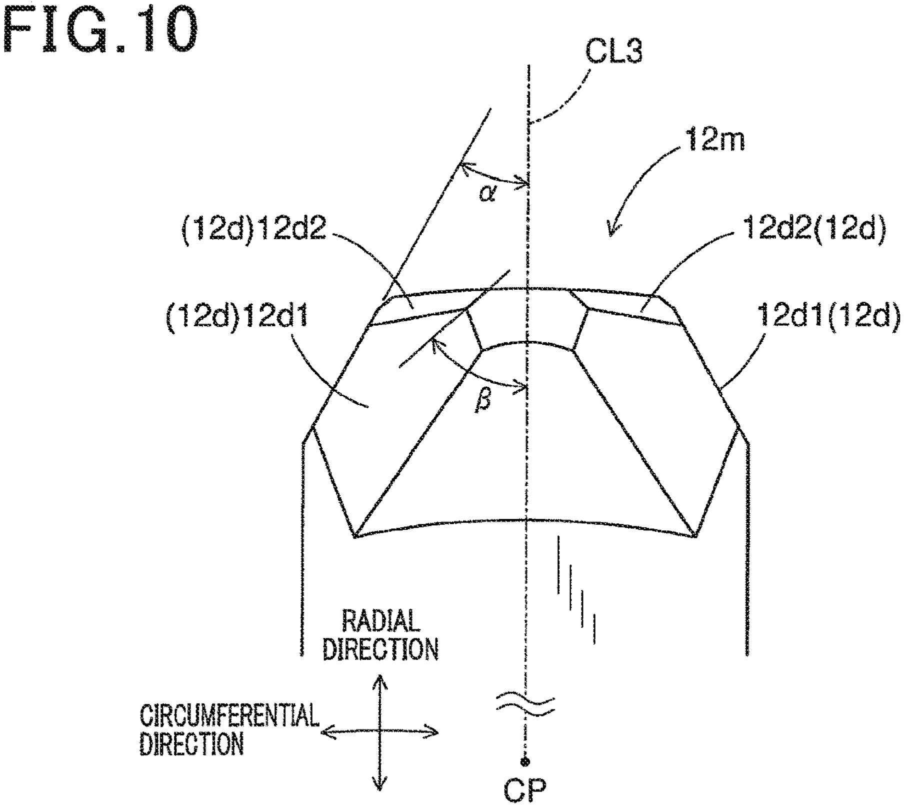
FIG. 10 shows a schematic diagram of a configuration example of a claw-shaped magnetic pole when viewed from the axial direction.

With reference to FIG. 9 and FIG. 10, a second configuration example of the claw-shaped magnetic poles 12*ma* and the claw-shaped magnetic poles 12*mb* which are circumferentially adjacent will be explained.

In the following, different points from the first configuration example will mainly be described.

The claw-shaped magnetic pole 12*ma* shown in FIG. 9 and FIG. 10 has, similar to the first configuration example, a radial end portion 12*c*, first portions 12*d*1, second portions 12*d*2, a root portion 12*e*, and the like The different point from the first configuration example is that the second portion 12*d*2 extends up to the root portion 12*e*.

Such a second portion 12*d*2 appears when the angle α is small (for example, within a range of 5°<α<26°.

When the second part 12*d*2 extends to the root portion 12*e*, the second portion 12*d*2 becomes a further shallower angle than the first portion 12*d*1 with respect to the tip portion 11*te* of the teeth 11*t*.

Therefore, the change in magnetic flux accompanying the rotation of the rotor 12 becomes smooth, thus it is possible to further reduce the magnetic noise.

A comparison of an output of the rotary electric machine 10 having the claw-shaped magnetic poles 12*ma*, 12*mb* configured as above and an output of the conventional technology will be described with reference to FIG. 11.

FIG. 11 shows an output ratio Pr3 in a case of measuring an output by varying the angle α of the first portion 12*d*1.

The output ratio Pr3 is an output of the rotary electric machine 10 in a case when the output of the conventional technology is set as 1.

The output of the present embodiment is, similar to the first embodiment, an output of power generated (i. e., power output).

According to a characteristic line SC3 shown in FIG. 11, when the claw-shaped magnetic poles 12*ma*, 12*mb* are formed within the range that the angle α is 5°<α<45°, the output is increased over the conventional technology.

The claw-shaped magnetic pole 12*ma*, 12*mb* may be formed so as to satisfy αa≤α≤αb when the output ratio calculated based on a desired output is set to Prc.

The circumferential distance τa, τb are numerical values satisfying 5°<αa<αb<45°.

In this way, the output more than an output having output ratio Prc can be reliably obtained.

Note that FIG. 11 shows results in a case where a circumferential distance τ is τ=9δ, a rotational speed of the rotor 12 is 1800 rpm, and a width ratio Lr is Lr1=0.45.

Although not shown, if the circumferential distance τ is in the range of 3δ≤τ≤15δ, the rotation speed of the rotor 12 is equal to or less than a rated speed, and the width ratio Lr is in the range of 0.20≤Lr1≤0.71, the same results as the characteristic line SC3 is obtained.

Third Embodiment

A third embodiment will be described with reference to FIGS. 12 to 14.

It should be appreciated that, in the third embodiment, components identical with or similar to those in the first and second embodiments are given the same reference numerals, and repeated structures and features thereof will not be described in order to avoid redundant explanation unless otherwise specified.

Therefore, different points from the first and second embodiments will be mainly described.

Figure 12:
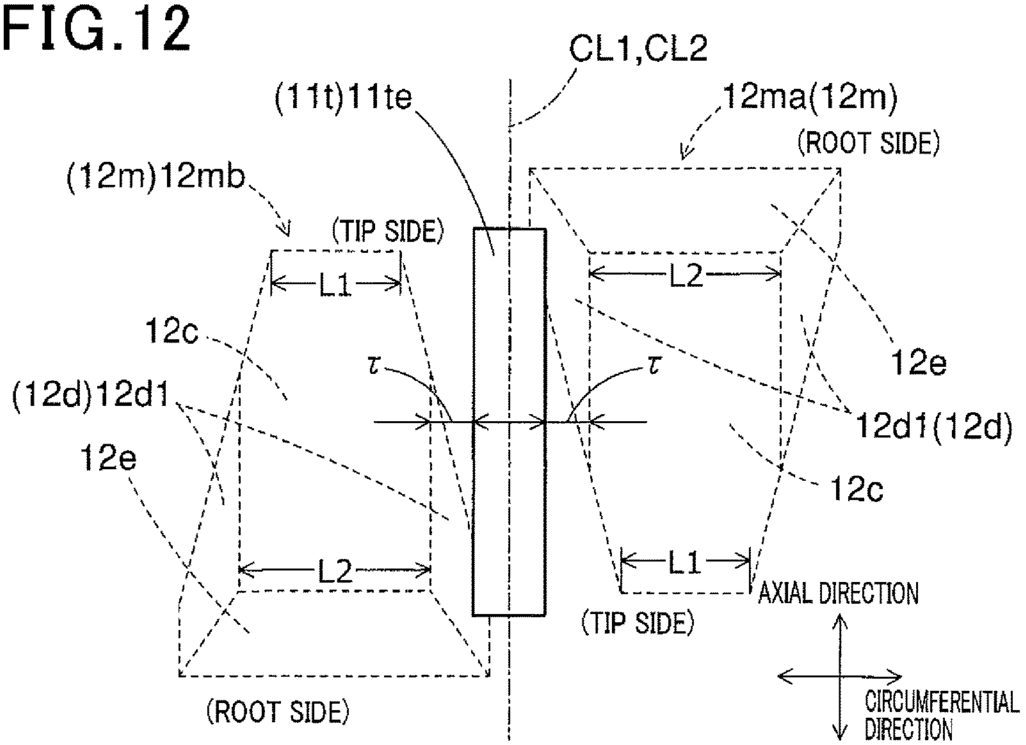
FIG. 12 shows a schematic diagram of teeth and claw-like magnetic poles in a fourth configuration example.
Figure 13:
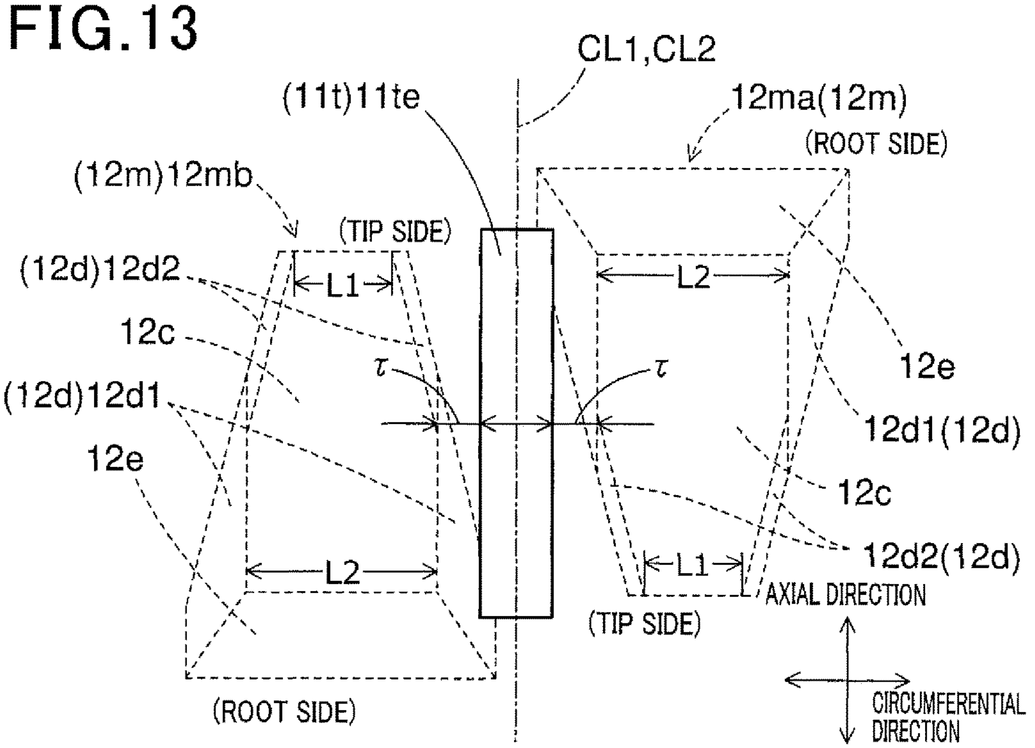
FIG. 13 shows a schematic diagram of teeth and claw-like magnetic poles in a fifth configuration example.

With reference to FIG. 12 and FIG. 13, a configuration example of the claw-shaped magnetic poles 12*ma* and the claw-shaped magnetic poles 12*mb* circumferentially adjacent will be explained.

The claw-shaped magnetic pole 12*ma* shown in FIG. 12 is a modification of the claw-shaped magnetic pole 12*ma* shown in FIG. 4.

The claw-shaped magnetic pole 12*ma* shown in FIG. 13 is a modification of the claw-shaped magnetic pole 12*ma* shown in FIG. 7.

In the following, as in the case of the first embodiment (specifically, FIG. 4) and the second embodiment (specifically, FIG. 7), the claw-shaped magnetic pole 12*ma* will be described as a representative feature.

The configuration of the first portion 12*d*1 of the claw-shaped magnetic pole 12*ma* shown in FIG. 12 is different from the claw-shaped magnetic poles 12*ma* shown in FIG. 4.

The first portion 12*d*1 shown in FIG. 4 is formed extending in the axial direction to the root portion 12*e*.

In contrast, the first portion 12*d*1 shown in FIG. 12 is formed extending in the axial direction up to an end portion of the pole core 12*a* (root side).

The configuration of the first portion 12*d*1 of the claw-shaped magnetic pole 12*ma* shown in FIG. 13 is different from the claw-shaped magnetic poles 12*ma* shown in FIG. 7.

The first portion 12*d*1 shown in FIG. 7 is formed extending in the axial direction to the root portion 12*e*.

In contrast, the first portion 12*d*1 shown in FIG. 13 is formed extending in the axial direction up to an end portion of the pole core 12*a* (root side).

Figure 14:
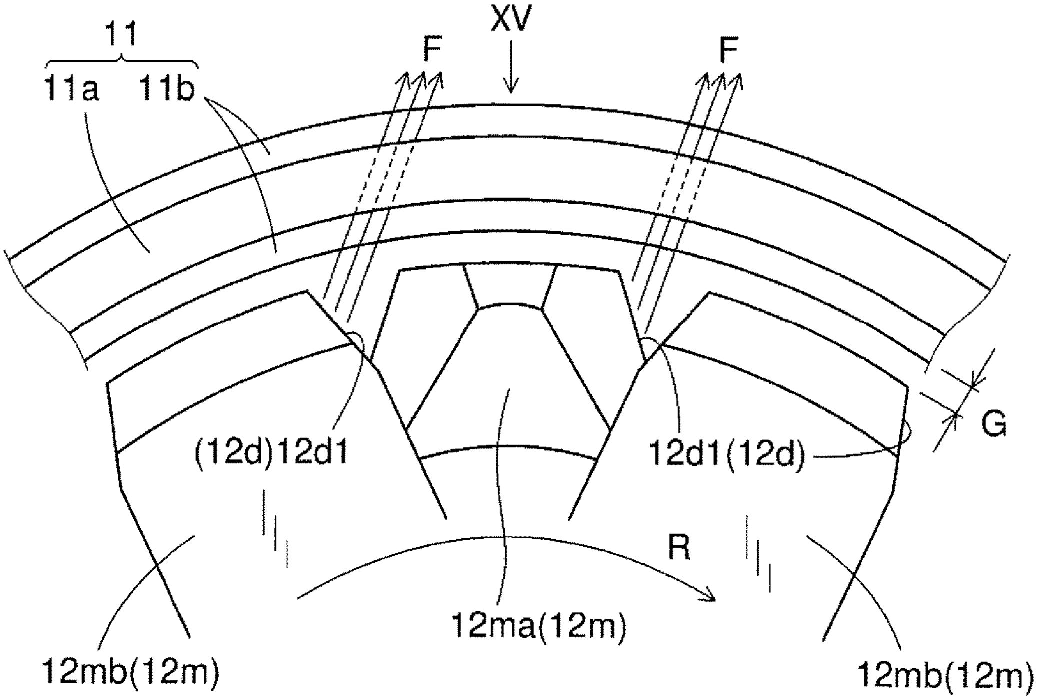
FIG. 14 shows a schematic diagram of a configuration example of the stator and the claw-shaped magnetic pole when viewed from the axial direction.

According to the configurations of the first portions 12*d*1 shown in FIG. 12 and FIG. 13, when the pole core 12*a*, 12 *b* of the rotor 12 are rotated in a rotation direction R as shown in FIG. 14, cooling air F that cools the stator windings 11*a* can be generated.

Therefore, since the temperature of the stator windings 11*a* is reduced and heat loss is also reduced, it is possible to improve the output.

Fourth Embodiment

The fourth embodiment will be described with reference to FIG. 15.

Figure 15:
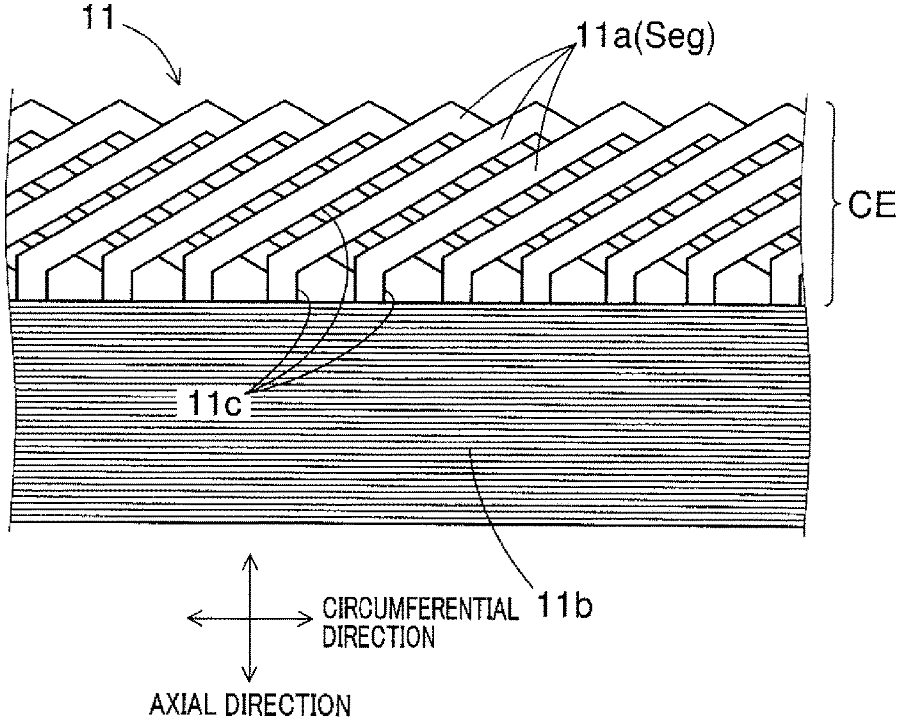
FIG. 15 shows a schematic view of a configuration example of the stator deployed in a circumferential direction when viewed from the radial direction.

FIG. 15 is a deployed view in the circumferential direction seen from an XV direction shown in FIG. 14.

It should be appreciated that, in the fourth embodiment, components identical with or similar to those in the first to third embodiments are given the same reference numerals, and repeated structures and features thereof will not be described in order to avoid redundant explanation unless otherwise specified.

Therefore, different points from the first to third embodiments will be mainly described.

The stator 11 shown in FIG. 15 is a modification of the stator 11 shown in FIG. 1.

A configuration of coil end portions CE of the stator windings 11*a* in FIG. 15 is different from the stator windings 11*a* shown in FIG. 1.

The stator windings 11*a* shown in FIG. 15 have the coil end portions CE formed by segment conductors Seg.

Each of the segment conductors Seg is bent such that it comes out from one slot 11*s* and enters into another slot 11*s*.

Ventilation paths 11*c* are formed between the segment conductors Seg, or internals sides of the stator windings 11*a* closer to the stator core 11*b*.

As described above, the ventilation paths 11*c* are formed by the segment conductors Seg in the stator 11.

Therefore, the cooling air F easily flows by the cooling fans 14 shown in FIG. 1 or the first portions 12*d*1 shown in FIG. 14, it is possible to further enhance the cooling effect.

Fifth Embodiment

A fifth embodiment will be described with reference to FIG. 16.

It should be appreciated that, in the fourth embodiment, components identical with or similar to those in the first to fourth embodiments are given the same reference numerals, and repeated structures and features thereof will not be described in order to avoid redundant explanation unless otherwise specified.

Therefore, different points from the first to fourth embodiments will be mainly described.

Figure 16:
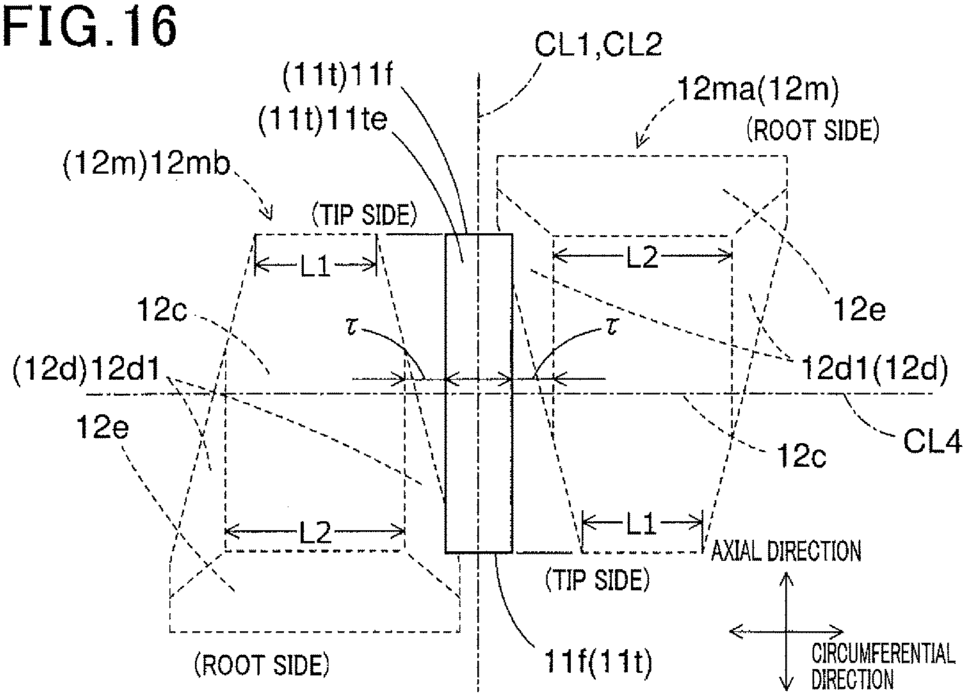
FIG. 16 shows a schematic diagram of teeth and claw-like magnetic poles in a sixth configuration example.

With reference to FIG. 16, a configuration example of the claw-shaped magnetic poles 12*ma* and the claw-shaped magnetic poles 12*mb* circumferentially adjacent will be explained.

In the following, as in the case of the first embodiment (specifically, FIG. 4), the claw-shaped magnetic' pole 12*ma* will be described as a representative feature.

Note that an axial center line CL4 shown in FIG. 16 is a center line in the axial direction of the teeth 11*t*.

The claw-shaped magnetic pole 12*ma* shown in FIG. 16 has a radial end portion 12*c*, first portions 12*d*1, a root portion 12*e*, and the like.

The difference from the claw-shaped magnetic pole 12*ma* shown in FIG. 4 is the following two points.

First, an axial length of the radial end portion 12*c* of the claw-shaped magnetic pole 12*ma* and an axial length of the tip portion 11*te* of the teeth 11*t* are configured to be the same length.

Second, it is configured that a tip surface of the claw-shaped magnetic pole 12*ma* (an axial end surface at a tip side in the drawing) and an axial end surface 11*f* of the teeth 11*t* are at the same radial positions.

According to the above configuration, the magnetic flux flowing between the stator 11 and the rotor 12 is aggregated in the tip portion 11*te* of the stator 11 side and the radial end portion 12*c* of the rotor 12 side.

Therefore, since it is possible to prevent flux from leaking from between the claw-shaped magnetic poles 12*m* due to the claw-shaped magnetic poles 12*m* being too long, it is possible to further improve the output.

Although not shown, the claw-shaped magnetic poles 12*m* (12*ma*, 12*mb*) and the teeth 11*t* shown in FIGS. 7, 9, 12, and 13, may be configured similarly to the claw-shaped magnetic poles 12*m* and the teeth 11*t* shown in FIG. 16.

Even in such a configuration, it is possible to prevent flux from leaking from between the claw-shaped magnetic poles 12*m*, and it is possible to further improve the output.

Sixth Embodiment

A sixth embodiment will be described with reference to FIG. 17.

It should be appreciated that, in the sixth embodiment, components identical with or similar to those in the first to fifth embodiments are given the same reference numerals, and repeated structures and features thereof will not be described in order to avoid redundant explanation unless otherwise specified.

Therefore, different points from the first to fifth embodiments will be mainly described.

Figure 17:
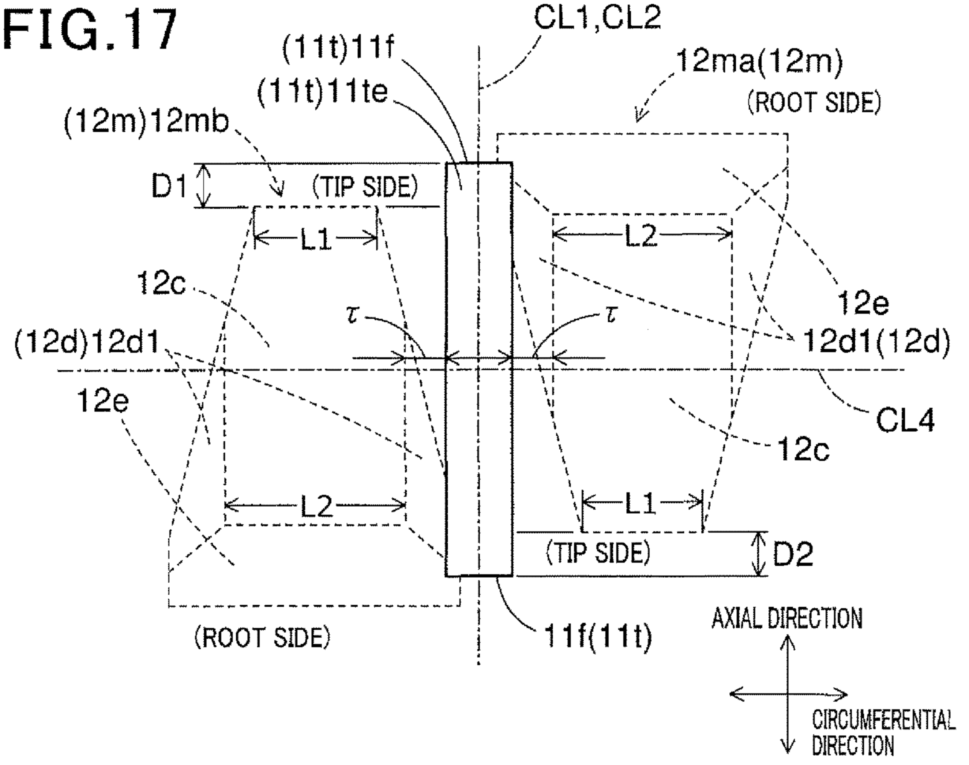
FIG. 17 shows a schematic diagram of teeth and claw-like magnetic poles in a seventh configuration example.

With reference to FIG. 17, a configuration example of the claw-shaped magnetic poles 12*ma* and the claw-shaped magnetic poles 12*mb* circumferentially adjacent will be explained.

Each of the claw-shaped magnetic poles 12*ma*, 12*mb* shown in FIG. 17 has a radial end portion 12*c*, first portions 12*d*1, a root portion 12*e*, and the like.

The differences from the claw-shaped magnetic poles 12*ma*, 12*mb* shown in FIG. 4 are the following two points regarding the axial length.

First, an axial end surface 11*f* of the teeth 11*t* (in a top side of the drawing) is configured longer by an axial distance D1 from a tip surface of the claw-shaped magnetic poles 12*mb* (an axial end surface at a tip side shown in the top side of the drawing).

Second, an axial end surface 11*f* of the teeth 11*t* (in a bottom side of the drawing) is configured longer by an axial distance D2 from a tip surface of the claw-shaped magnetic poles 12*ma* (an axial end surface at a tip side shown in the bottom side of the drawing).

The axial distances D1, D2 may be set arbitrarily.

In other words, the axial distances may be 0<D1<D2, or may be D1=D2, or may be D1>D2>0.

According to the above-described configuration, the To tips of the claw-shaped magnetic poles 12*m* are positioned inside the stator core 11*b* including the axial end surfaces 11*f* of the teeth 11*t*.

Since the axial length of the claw-shaped magnetic poles 12*m* is short, it is possible to prevent flux from leaking from between the claw-shaped magnetic poles 12*m*, and it is possible to further improve the output.

Although not shown, the claw-shaped magnetic poles 12*m* (12*ma*, 12*mb*) and the teeth 11*t* shown in FIGS. 7, 9, 12, and 13, may be configured similarly to the claw-shaped magnetic poles 12*m* and the teeth 11*t* shown in FIG. 17.

Even in such a configuration, it is possible to prevent flux from leaking from between the claw-shaped magnetic poles 12*m*, and it is possible to further improve the output.

Other Embodiments

Although it has been described in accordance with the first to sixth embodiments for the present disclosure in the above, the present disclosure is not in any way limited to the embodiments described above.

In other words, various modifications are possible within the scope of the present disclosure.

For example, configurations shown below may be realized.

It is configured to applying the housing 13 having the front housing 13F and the rear housing 13R in the first to sixth embodiments described above (refer to FIG. 1).

Figure 18:
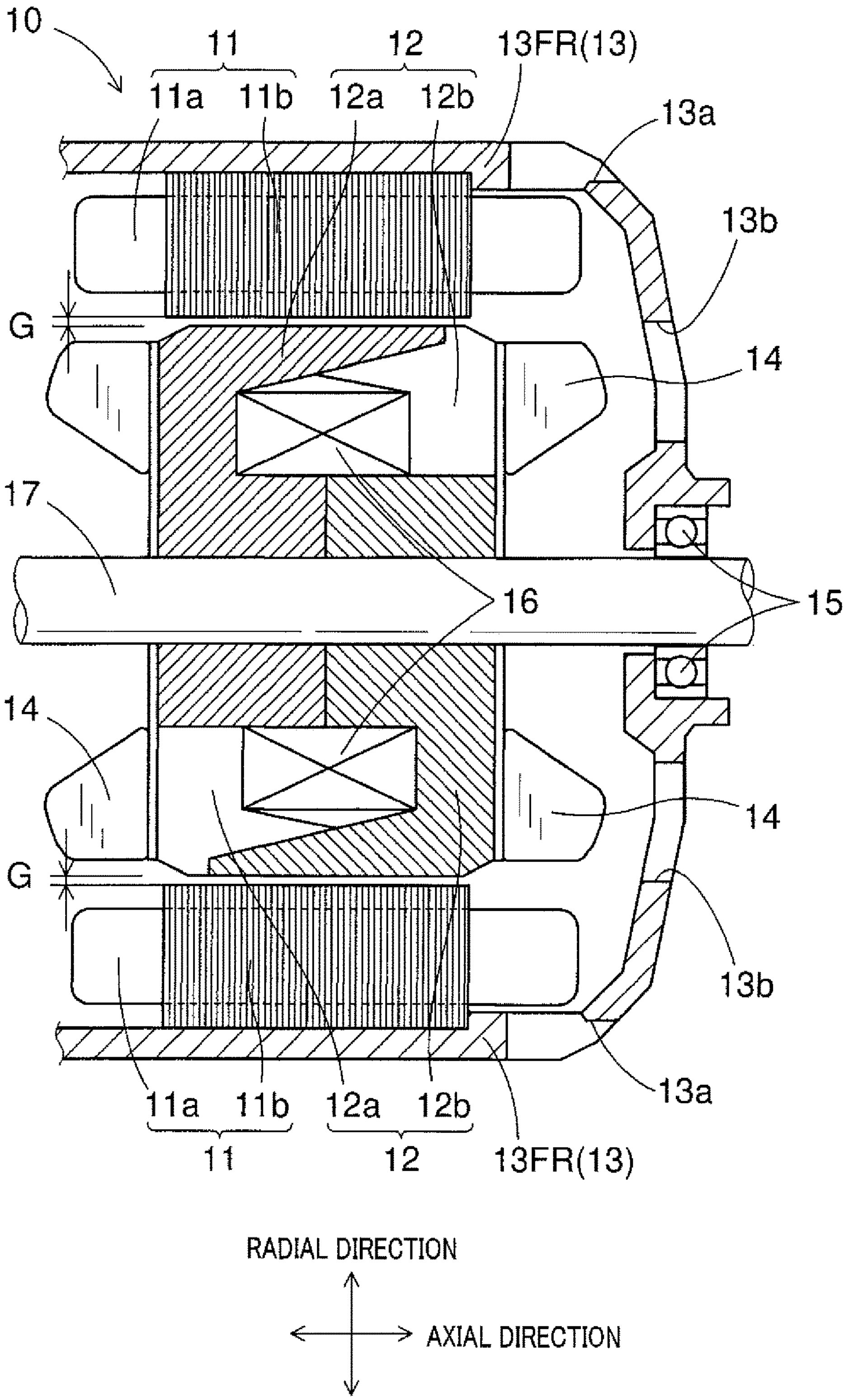
FIG. 18 shows a schematic partially sectional view of a rotary electric machine in a second configuration example.

Instead of the present configuration, it may be configured to apply a housing 13 using an integral housing 13FR with integrated front housing 13F and rear housing 13R, as shown in FIG. 18.

Since only the configuration of the housing 13 is different, similar effects as the first to sixth embodiments can be obtained.

It is configured to apply the stator core 11*b* of the semi-closed slot type in the first to sixth embodiments described above (refer to FIG. 1).

Figure 19:
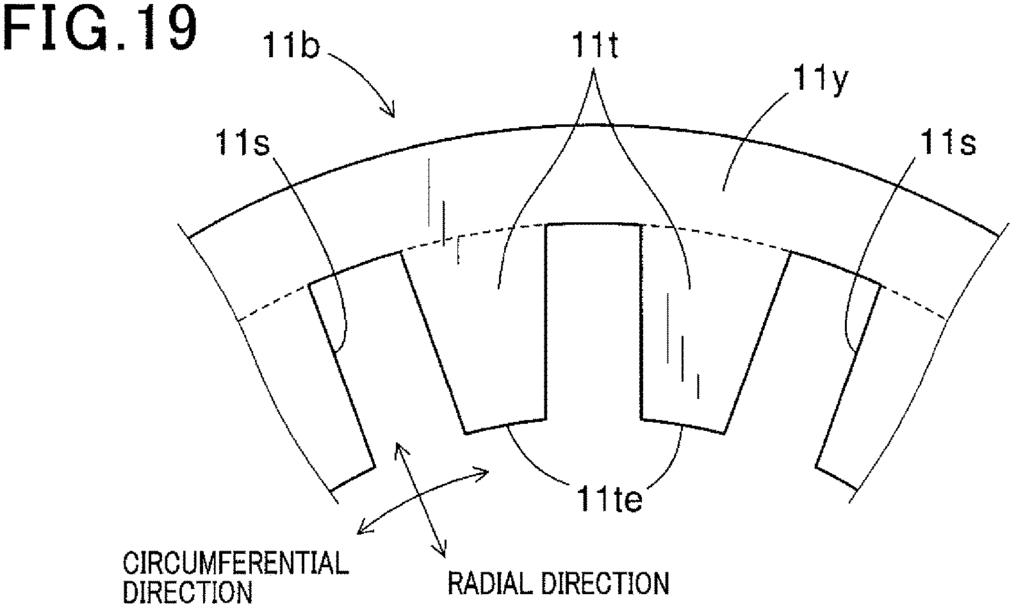
FIG. 19 shows a schematic plan view of a part of a stator as viewed from an axial direction in the second configuration example.

Instead of the present configuration, it may be is configured to apply a stator core 11*b* of an open slot type, as shown in FIG. 19.

Since only the configuration of the slots 11*s* is different, similar effects as the first to sixth embodiments can be obtained.

It is configured to use the pole cores 12*a*, 12*b* having the U-shaped grooves 12*au*, 12*bu* in the first to sixth embodiments described above (refer to FIG. 1).

Figure 20:
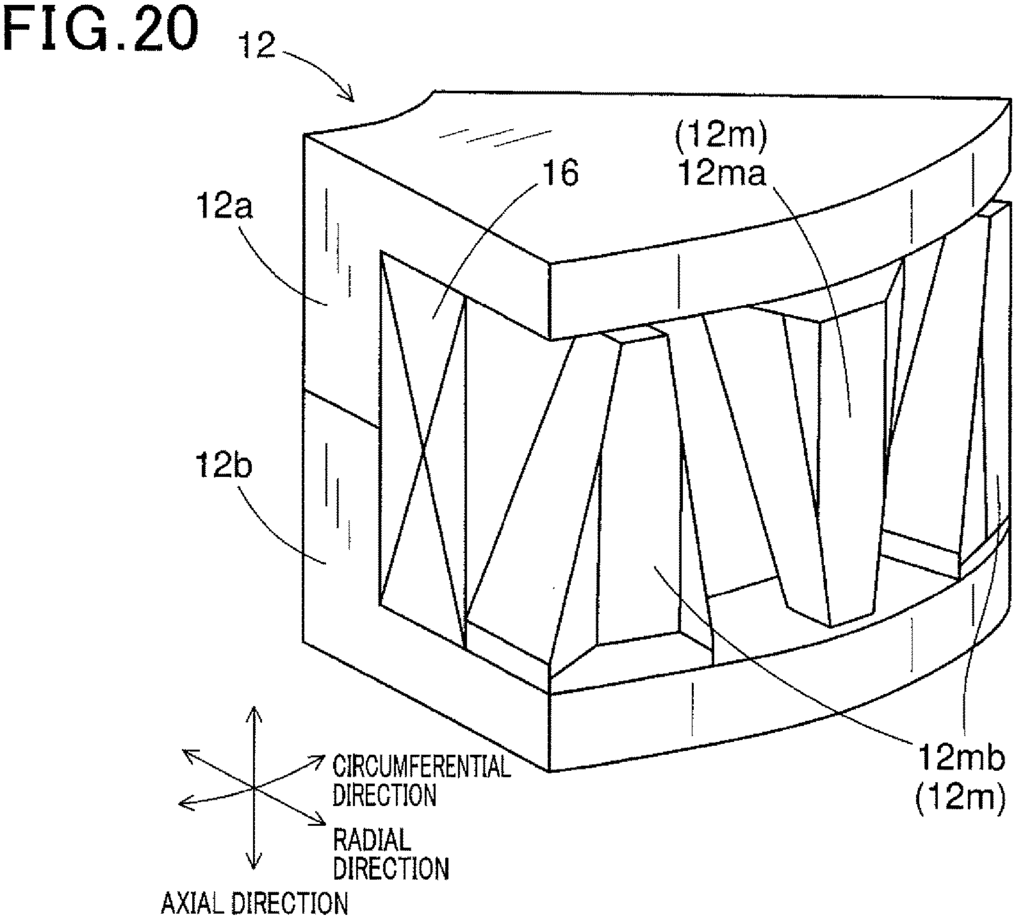
FIG. 20 shows a schematic perspective view of a part of a rotor in the second configuration example.

Instead of the present configuration, it may be configured to use pole cores 12*a*, 12*b* having no U-shaped grooves 12*au* 12*bu* as shown in FIG. 20.

It is effective in cases where between the pole core 12*a* and the claw-shaped magnetic pole 12*mb*, or between the pole core 12*b* and the claw-shaped magnetic pole 12*ma* are separated to such a degree that the magnetic flux leakage does not occur.

Since only the structure of the pole cores 12*a*, 12*b* is different, similar effects as the first to sixth embodiments can be obtained.

It is configured that the inter-pole center position CL1 that is the center between the claw-shaped magnetic pole 12*ma* and the claw-shaped magnetic pole 12*mb* matches the axial direction in the first to sixth embodiments described above (refer to FIGS. 4, 7, 9, 12, 13, 16, 17).

Instead of the present configuration, it may be configured that the inter-pole center position CL1 extends in a direction intersecting the axial direction (oblique direction).

Figure 21:
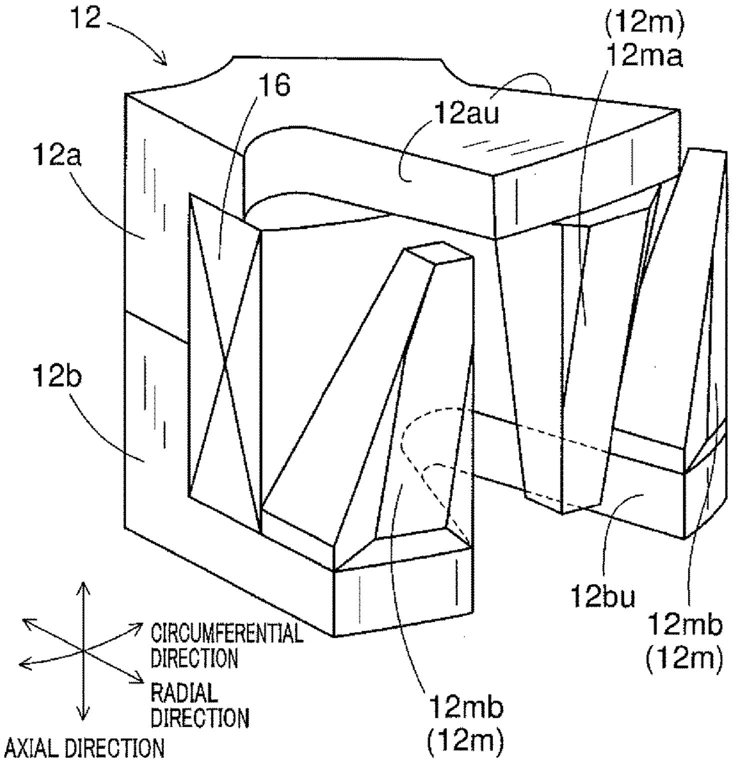
FIG. 21 shows a schematic perspective view of a part of a rotor in a third configuration example.
Figure 22:
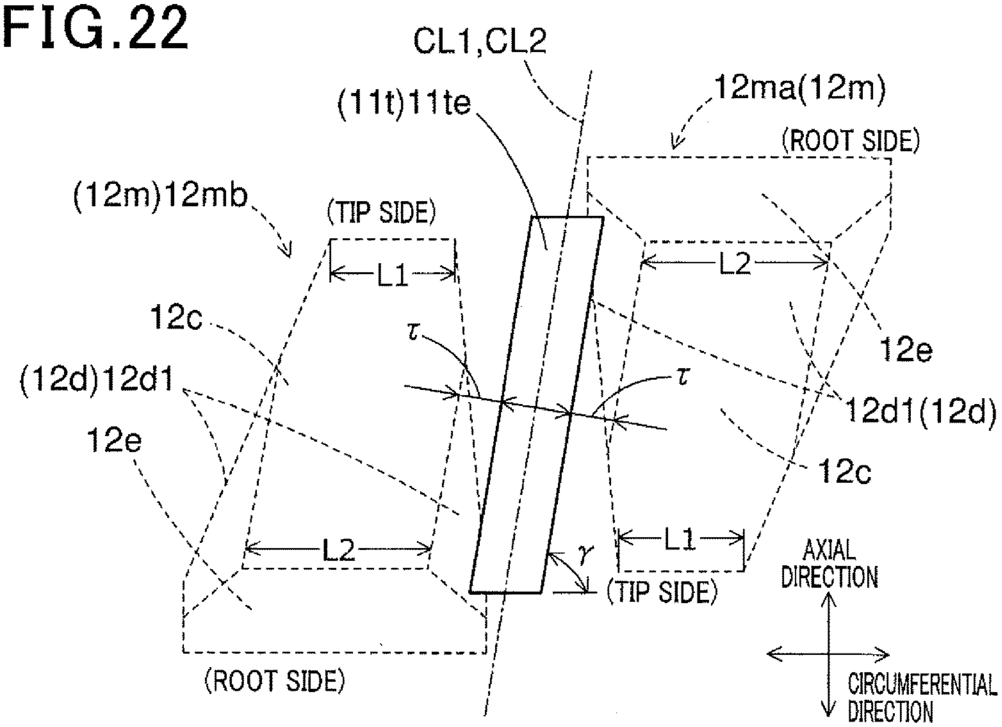
FIG. 22 shows a schematic diagram of teeth and claw-like magnetic poles in an eighth configuration example.

For example, the claw-shaped magnetic poles 12*ma* and the claw-shaped magnetic poles 12*mb* shown in FIG. 21 and FIG. 22 are applicable.

FIG. 21 corresponds to a modification of FIG. 3, while FIG. 22 corresponds to a modification of FIG. 4.

The tip portion 11*te* of the teeth 11*t* may be formed in a parallelogram shape as shown in FIG. 22, or may be formed in a rectangular shape as shown in FIG.

Further, the shape of the claw-shaped magnetic pole 12*m* may be freely configured as long as the circumferential distance τ is within the range of 3δ≤τ≤15δ, and the width ratio Lr is within the range of 0.20≤L1/L2≤0.71.

For example, such as a saw tooth shape or a gear shape are applicable.

Although not shown, the pole cores 12*a*, 12*b* may not be provided with the U-shaped grooves 12*au*, 12*bu* as shown in FIG. 20.

Since only the shape of the claw-shaped magnetic pole 12*m* is different, similar effects as the first to sixth embodiments can be obtained.

It is configured to apply the inner rotor type generator to the rotary electric machine 10 in the first to sixth embodiments described above (refer to FIG. 1).

Instead of the present configuration, it may be configured to apply an inner rotor type electric motor or a motor-generator, or it may be configured to apply an outer rotor type generator, an electric motor, or a motor-generator.

The outer rotor type disposes the stator 11 on the inner diameter side and the rotor 12 on the outer diameter side.

Since only the function of the rotary electric machine 10 is different, or the arrangement of the stator 11 and the rotor 12 is different, similar effects as the first to sixth embodiments can be obtained.

It should be noted that an output in a case of power generating function of the motor-generator in FIGS. 5, 6, 11 is an output of power generated (i.e., power output).

Further, an output in a case of the electric motor or a motor function of the motor-generator is torque.

It is configured to air-cool the rotary electric machine 10 by forming the cooling air intake holes 13*b* and the cooling air discharge holes 13*a* in the housing 13, and by the cooling air F generated by the cooling fans 14 or the first portions 12*d*1 in the first to sixth embodiments described above (refer to FIG. 1, FIG. 14).

Instead of the present configuration, it may be configured to water-cool the rotary electric machine 10 by forming a cooling water inlet port for introducing cooling water and a cooling water discharge port for discharging the cooling water in the housing 13, and by splashing the introduced cooling water by the cooling fans 14 or the first portions 12*d*1.

Since only the cooling method of either air or water is different, similar effects as the first to sixth embodiments can be obtained.

It is configured to form the claw-shaped magnetic pole 12*m* (12*ma*, 12*mb*) by the soft magnetic material in the first to sixth embodiments described above (refer to FIG. 3, FIG. 21).

Instead of the present configuration, the claw-shaped magnetic pole 12*m* may be configured to be formed by a magnet magnetized with N-pole or S-pole, or may be configured by combining the soft magnetic material and the magnet.

Since only the magnetomotive force source is different, similar effects as the first to sixth embodiments can be obtained.

It should be noted that since the claw-shaped magnetic poles 12*m* become the magnetomotive force source, the field coil 16 is not required.

Since it is possible to form larger claw-shaped magnetic poles 12*m* for an amount corresponding to the field coil 16 that is not required, it is possible to increase the generated magnetic flux.

What is claimed is:

1. A rotary electric machine for vehicles comprising:

a stator having a stator core in which slots are located between a plurality of teeth extending radially at intervals in a circumferential direction, and stator windings incorporated with the slots;

a pair of pole cores formed with tapered claw-shaped magnetic poles disposed at a predetermined pitch in the circumferential direction, the pole cores are fixed to a shaft such that the claw-shaped magnetic poles face and engage with each other, the pole cores are disposed so that an air gap is formed between radial end portions of the claw-shaped magnetic poles and tip portions of the teeth; and a rotor having a field coil disposed so as to be covered by the claw-shaped magnetic poles; wherein, each of the claw-shaped magnetic poles is formed with an air gap expanding portion formed on at least portions of both side portions in the circumferential direction, another air gap is formed between the air gap expanding portion and the tip portions of the teeth that is larger than the air gap formed between the radial end portions and the tip portions of the teeth;

each of the claw-shaped magnetic poles is configured such that when an inter-pole center position which is a center of the claw-shaped magnetic poles adjacent to each other in the circumferential direction and a teeth center position which is a center of the teeth are at the same radial positions, tip portions of the claw-shaped magnetic poles do not overlap in the radial direction with each of the radial end portions of the claw-shaped magnetic poles adjacent to each other, and the tip portions of the claw-shaped magnetic poles overlap in the radial direction with at least a portion of each of the air gap enlargement portions of the claw-shaped magnetic poles adjacent to each other in the circumferential direction;

when a circumferential distance between the radial end portion and the tip portion of the teeth is indicated by τ, and when the air gap is indicated by δ, each of the claw-shaped magnetic poles is formed in the range of 3δ≤τ≤15δ; and when a claw-tip end face width is indicated by L1, and when a claw-root end face width is indicated by L2, each of the claw-shaped magnetic poles is formed in a range of $0.20 \leq L1/L2 \leq 0.71$.

2. The rotary electric machine for vehicles according to claim 1; wherein, the air gap enlarged portion includes a first portion that is formed such that an angle formed between the first portion and a central axis of the claw-like magnetic pole is a when viewed from an axial direction, and a second portion extending from the tip portion of the claw-shaped magnetic pole in the axial direction, the second portion is formed such that an angle formed between the second portion and the central axis is $\beta$; and the first portion and the second portion are formed such that $\alpha < \beta$.

3. The rotary electric machine for vehicles according to claim 2; wherein, the first portion is formed within a range of $5° < \alpha < 45°$.

4. The rotary electric machine for vehicles according to claim 3, wherein, the air gap expanding portion is formed extending up to an end portion of the pole core.

5. The rotary electric machine for vehicles according to claim 2, wherein, the air gap expanding portion is formed extending up to an end portion of the pole core.

6. The rotary electric machine for vehicles according to claim 1, wherein, the air gap expanding portion is formed extending up to an end portion of the pole core.

7. The rotary electric machine for vehicles according to claim 1, wherein, coil end portions of the stator winding are formed by segment conductors.

8. The rotary electric machine for vehicles according to claim 1, wherein, the tip portions of the claw-shaped magnetic poles are positioned radially inside both the stator core and axial end faces of the teeth.

* * * * *